Jan. 12, 1937.    J. R. KNOWLES ET AL    2,067,273
CENTRIFUGAL SEPARATOR
Filed Nov. 1, 1932    5 Sheets-Sheet 1

INVENTORS
JOSEPH R. KNOWLES &
BENJAMIN C. CARTER
BY
ATTORNEY.

Jan. 12, 1937. J. R. KNOWLES ET AL 2,067,273
CENTRIFUGAL SEPARATOR
Filed Nov. 1, 1932 5 Sheets-Sheet 2
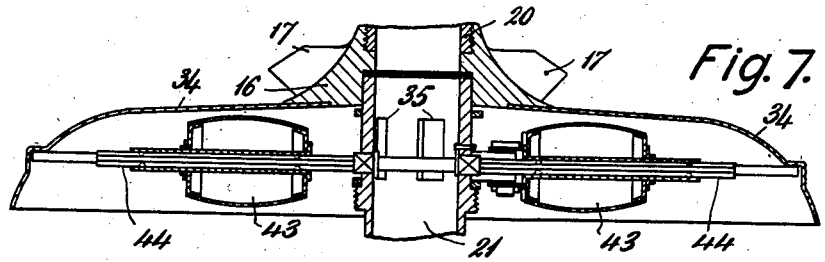
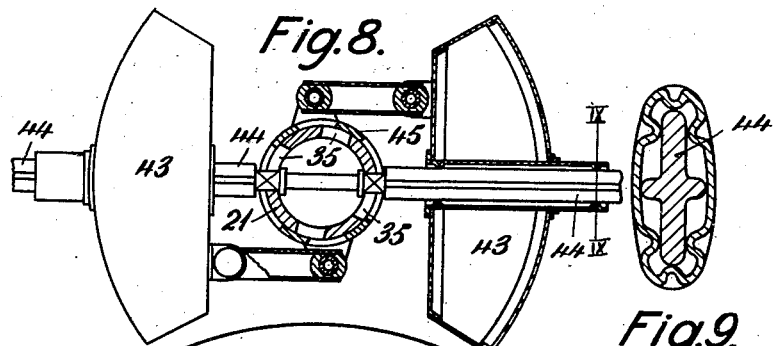
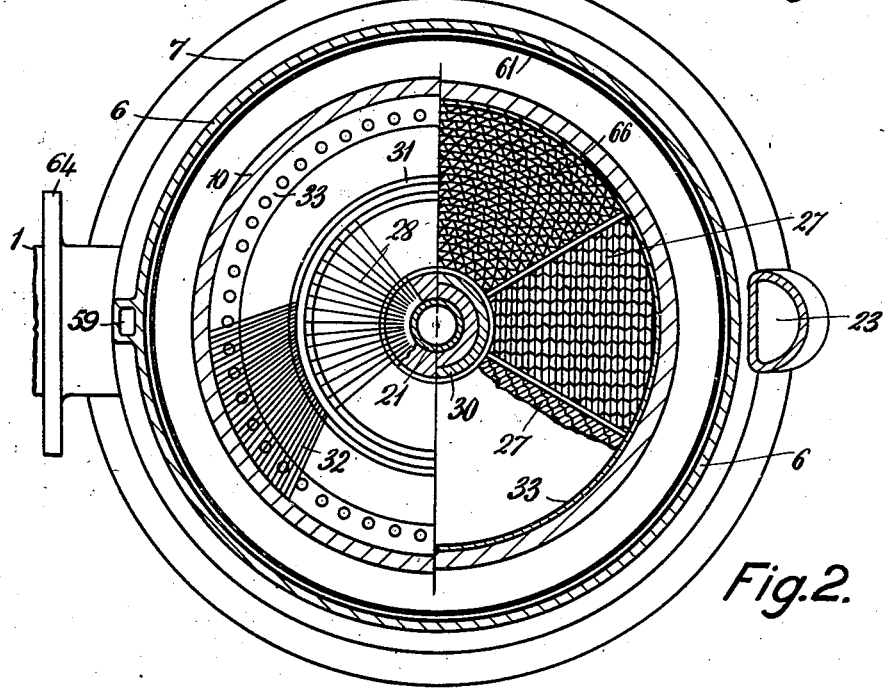
INVENTORS
JOSEPH R. KNOWLES &
BENJAMIN C. CARTER
By A. E. Odell
ATTORNEY.

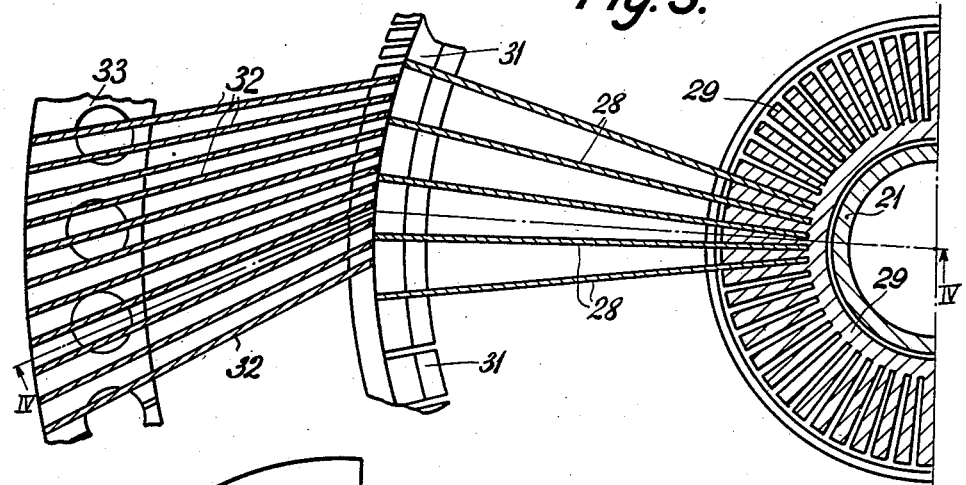
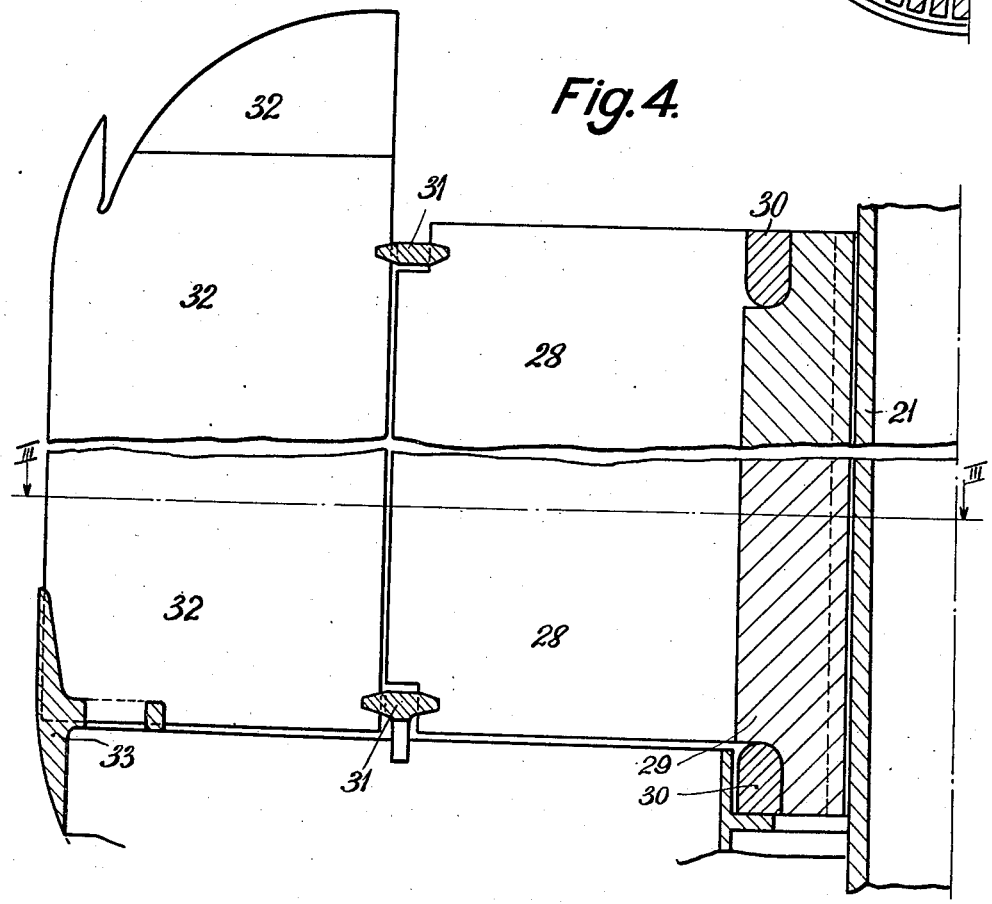

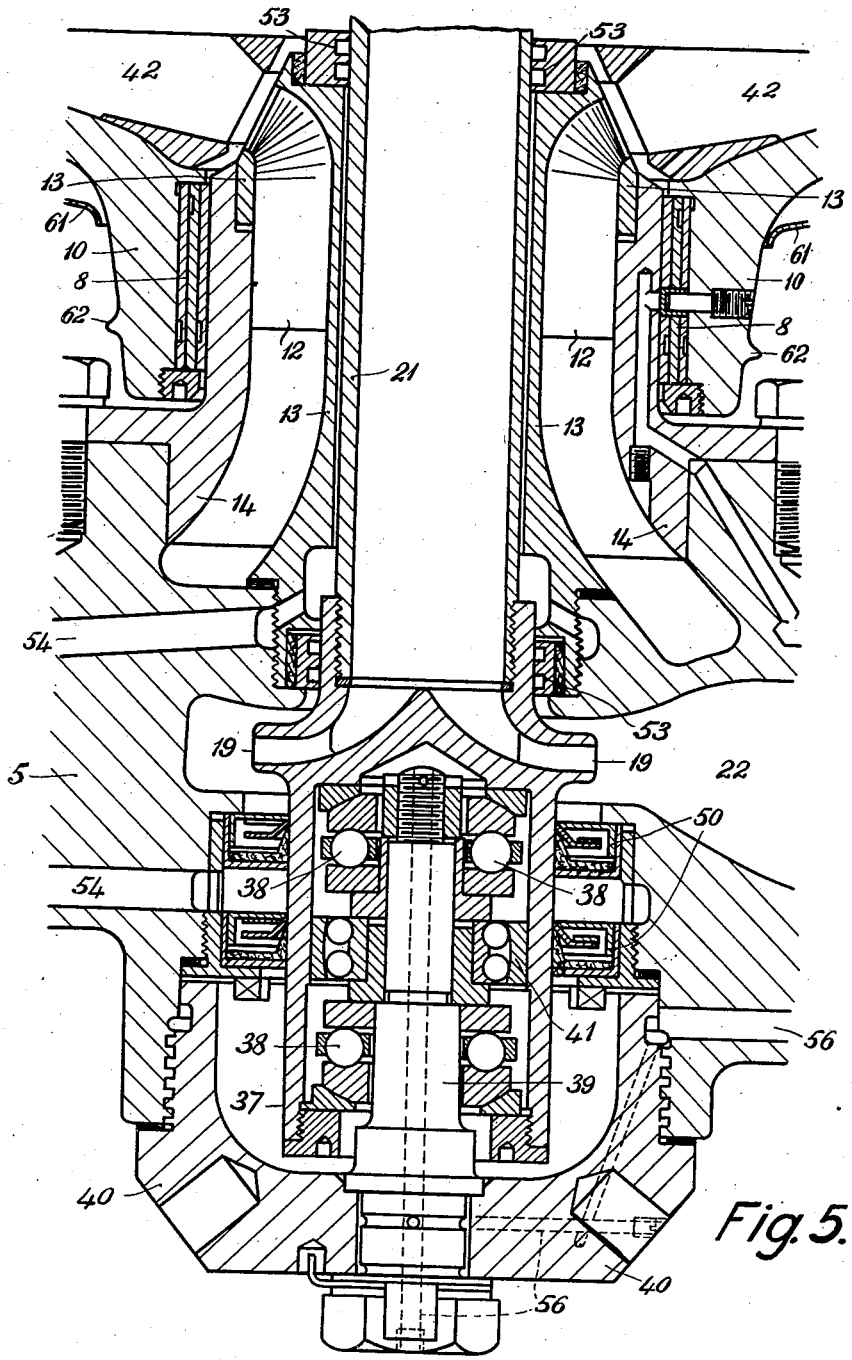

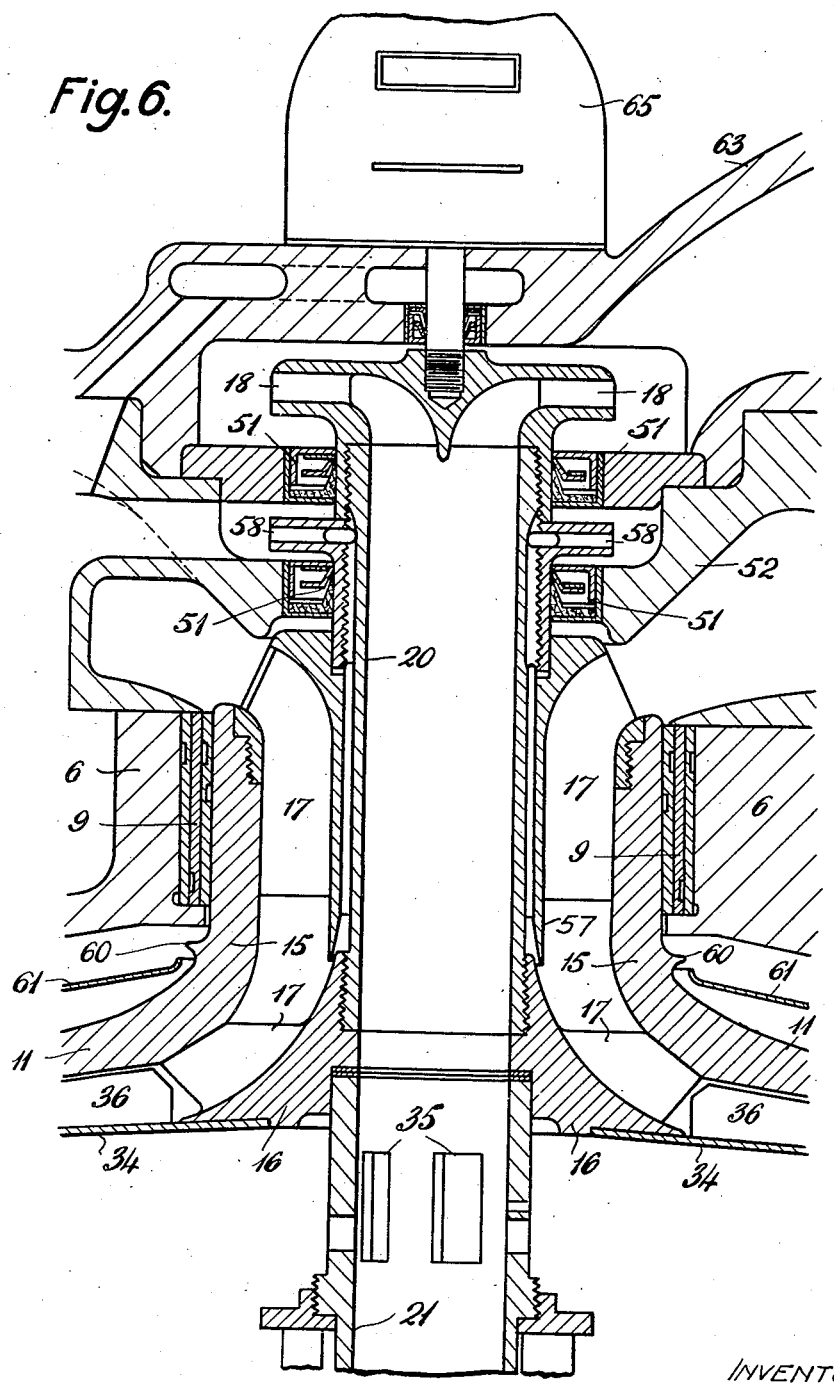

Patented Jan. 12, 1937

2,067,273

UNITED STATES PATENT OFFICE 2,067,273

CENTRIFUGAL SEPARATOR

Joseph Russell Knowles and Benjamin Charles Carter, Strand, London, England

Application November 1, 1932, Serial No. 640,580
In Great Britain December 18, 1931

7 Claims. (Cl. 233—21)

This invention relates to centrifugal separators for removing solid impurities from fluids or dividing fluid mixtures into their several constituents.

The aim of the invention is to produce a separator of moderate dimensions capable of dealing efficiently with large currents of fluid, as is required, for instance, in the purification of a water supply or of the tank water of oil-fueled ships; of coping with a wide range of fluid mixture, say from oil-contaminated water to water-contaminated oil; and of adapting itself to wide variations in the composition of the fluid treated.

The separator comprises a separating chamber occupying most of the interior of a rotating drum which runs full of fluid, the mixture to be treated being admitted at one end, and the separated fluid constituents leaving at the other end by outlets widely separated radially. To attain high capacity the invention aims to procure high speed eddyless smooth flow in the axial direction throughout the cross-section of the separating chamber. To this end the invention includes a rotating separating chamber the interior of which is divided into channels of small mean hydraulic depth, the channels running substantially parallel with the axis of rotation, and also extending from the middle to the periphery of said chamber. More particularly the invention contemplates the division of the separating chamber by thin vanes parallel with the axis of rotation set in radial planes or not greatly diverging from radial planes, so that fluid particles within the separating chamber have but a short free path in a circumferential direction, but can move to the middle of the chamber or to its periphery as well as travelling freely along it lengthwise. Such sub-division of the fluid path greatly raises the lower critical velocity of flow below which the flow is smooth, eddyless or laminar, and thereby enables a large current of fluid to be passed through the separator with a minimum expenditure of energy. Moreover the absence of eddying disturbances contributes to a rapid and thorough separation of the constituents.

With a view to the thorough elimination of eddying disturbances the invention further includes a rotating drum to which fluid to be treated is admitted at one end in combination with means subdividing part of the length of the drum adjacent the inlet into narrow tubular channels parallel with the axis of rotation.

To ensure complete separation and purity of the separated constituents notwithstanding wide variations in the composition of the fluid treated the invention includes a rotating separating chamber having a plurality of outlets for different constituents at a distance from each other radially, and having means for controlling the outflow through one or more of said outlets, so that the surface of contact between two constituents within the separating chamber is not allowed to approach the outlet for either constituent. (By "surface of contact" is to be understood the annular zone intervening between regions filled by substantially pure constituents, a zone which will the more nearly approximate to a surface the more perfect the separation.) For cases where the fluid treated is liable to vary widely or quickly in composition, or where the separator must be left for long periods unattended, the invention provides for automatic actuation of such control means by the radial displacement of the surface of contact between two constituents within the separating chamber. More specifically the invention contemplates the actuation of an outlet control valve by means of floats intermediate in specific gravity between two constituents and mounted to move inward and outward within the separating chamber under centrifugal forces and the hydrostatic pressure of the two constituents in which the floats are immersed, the floats following the movement of the surface of contact of the two constituents.

Further features and aspects of the invention will appear more fully from the following description of the accompanying drawings which show a separator devised in accordance with the principles above indicated and embodying the features mentioned as well as other improvements.

The separator as here shown embodies the invention in a form suitable for treating the tank water of oil-fueled ships, i. e. for separating two liquid constituents.

Figure 2 is a transverse section on the line II—II of Figure 1 showing some only of the tubes and vanes which divide the fluid path through the rotating drum.

Figure 3 is an enlarged plan of a few of the vanes in section on the line III—III of Figure 4, and Figure 4 a sectional elevation of them on the line IV—IV of Figure 3.

Figure 5 is an enlarged axial section through the lower bearings of the rotor and its inlet.

Figure 6 is an enlarged axial section through the upper bearing and glands of the rotor and its outlets.

Figure 7 is a sectional elevation and

Figure 1:
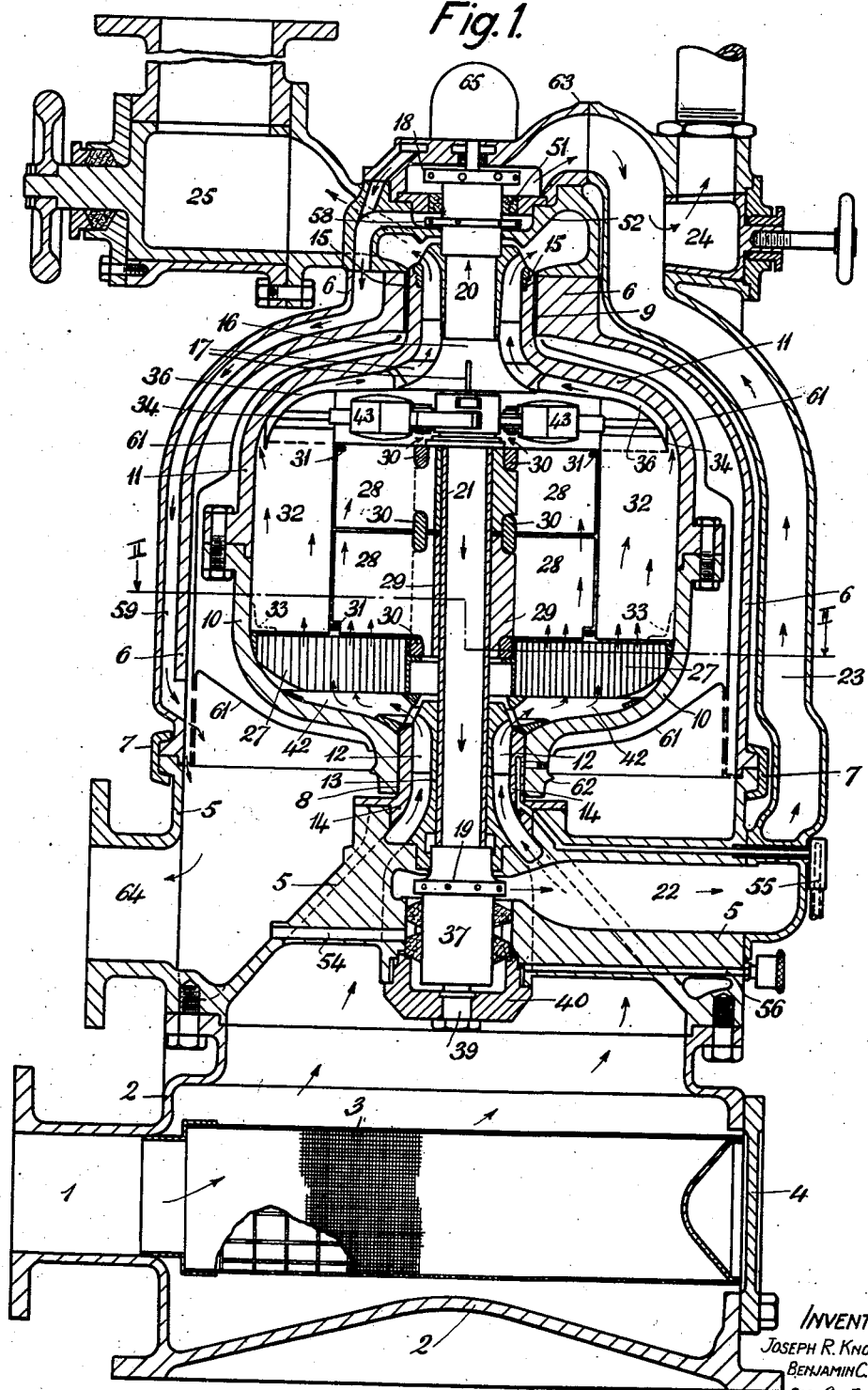
Figure 1 is an axial section of it, many details being omitted or shown incompletely on account of the small scale of the drawings.

Figure 8 a plan of the float governor controlling an outlet valve, and

Figure 9 is a cross-section of it on the line IX—IX of Figure 8.

Consonant with the assumed use of the separator the lighter fluid will be referred to as oil, and the heavier as water.

The oil-contaminated water to be treated enters through the inlet 1 a base chamber 2 in which is located a filter 3 built of perforated metal and metal gauze. The filter is shown of cylindrical form, fitting the inlet of the chamber 2, and is removable for cleaning by detachment of the plate 4.

Upon the base chamber is secured a rotor casing formed in two parts 5, 6 held together by a divided channelled ring 7 engaging over bevelled flanges. This casing supports in journal bearings 8, 9 a drum 10, 11. These bearings may be built of concentric sleeves or otherwise so constructed as to be capable of yielding slightly under radial pressures. The liquid entering the drum is given a circumferential velocity by vanes 12 on an inlet sleeve 13 which with the inlet pivot 14 is attached to the lower part 5 of the rotor casing, the two forming an annular inlet channel. The water leaves the drum through a similar annular outlet channel formed between the upper neck 15 of the drum and a thrust cone 16, which carry webs or vanes 17 by which kinetic energy of the water due to its circumferential velocity is largely taken up. The oil leaves by reaction nozzles 18, 19 at the upper and lower ends of a central channel through the rotor formed by the oil discharge tube 20, which screws into the thrust cone 16, and a tubular spindle 21. The oil leaving by the lower nozzles passes by a channel 22 in the lower rotor casing 5 to an attached tube 23 into which the nozzles 18 also deliver, and which conveys the oil to the outlet valve 24. This is a two-way valve, which on starting up is set to direct the issuing fluid back to the sump, but upon satisfactory separation being attained can be turned to deliver the oil into a tank. A similar valve 25 is set to deliver water overboard only when the desired standard of purity is reached. These or other valves will also serve, when the separator is dealing with a mixture of substantially constant or but slowly varying composition, to ensure the purity of the issuing constituents; for which purpose it suffices if a valve controlling the outflow of the smaller constituent is so adjusted from time to time that the surface of contact of the separated fluids within the drum is not allowed to approach either exit from the drum.

In the lower part 10 of the drum, near its entrance end, the upwardly and outwardly injected fluid after passing vanes 42 with which it may exchange angular momentum is directed parallel to the axis of the drum by dividing up its path into narrow tubular channels parallel with the axis. This may conveniently be done by building up a block of square or preferably half-hexagonal tubes 27, or of alternate concentric plain and corrugated rings. Above these the cross-section of the drum is divided by vanes which in their central part are radial and in their outer part deflected from radial planes all in the same sense. In the construction illustrated the inner edges of inner radial vanes 28 are inserted in radial slots in a sleeve 29 and retained by rings 30 engaging around narrow tail pieces on the vanes; the vanes and sleeve are divided lengthwise to admit an additional retaining ring. The outer edges of the vanes 28 are located by notched rings 31 nesting in notches in the vanes. Outer vanes 32 which, though plane, are not radial but tangential to a cylindrical surface concentric with the drum, engage at their inner edges in corresponding notches in the rings 31 and at their outer lower corners enter notches in a ring 33 which fits within the drum.

Above the vanes a domed sheet metal disc 34 riveted to the thrust cone 16 confines the fluid path to exits from the drum widely separated radially, namely a narrow annular channel adjacent the periphery of the drum through which the water passes, and the hollow spindle 21 to which the oil has access through ports 35. On the disc 34 are welded vanes 36 to which the converging stream of water imparts some of its angular momentum.

In use there is a resultant upward fluid pressure upon the drum approximately equal to its weight, so that the rotor is substantially floating. Any resultant thrust upon the drum may be taken care of by a thrust bearing at one or other end of the drum. In the construction shown such a bearing is contained within a shell 37 integral with the lower oil nozzle casting 19 which is screwed to the lower end of the spindle 21. It comprises two rings of balls 38 through which either an upward or downward thrust may be conveyed to a spindle 39 secured in a cap 40 which screws into the lower casing 5, together with a bearing 41 affording journal support from the spindle 39 to a spherical seating in the shell 37. The uppermost and lowermost thrust races also have spherical surfaces concentric with this seating, so that the spindle 21 may rock slightly relatively to the spindle 39 and the rotor casing to the extent permitted by the yielding bearings 8, 9. When the apparatus is to be dismantled the rotor may be lowered so as to rest on the casing by unscrewing the cap 40 by the aid of a tommy bar inserted through the opening covered by plate 4.

To hinder leakage and re-pollution of the separated constituents there are glands 50 between the shell 37 and the casing 5, glands 51 between the oil-discharge tube 20 and the water-outlet casting 52, and glands 53 between the spindle 21 and the inlet sleeve 13. Any liquid that may leak past the glands is conducted by channels 54 and 59 to the sump.

To facilitate the starting of the separator provision is made for injecting oil at 55 into the bearing 8. The bearings in the shell 37 are lubricated through a channel 56 which is carried to the top of the shell so that the incoming lubricant will displace any heavier fluids that may have found their way into the shell.

In case any separation of oil occurs in the passage of the water from the drum exit around the disc 34 to the water outlet casting 52, a separating lip 57 may be provided close to the discharge tube 20 which forms the inner wall of the annular channel within the upper neck 15 of the drum, and any liquid skimmed off by this issues through reaction nozzles 58 and is returned to the sump through the channel 59.

Any liquid leaking past the bearing 9 is flung off the drum by the lip 60, and is prevented from falling again upon the drum by a sheet metal enclosure 61, which closely surrounds the whole of the drum so that the latter may not impart motion to any considerable body of surrounding fluid. A similar lip 62 may be provided on the lower neck of the drum.

The several parts of which the stationary portion of the separator is built up, namely the base chamber 2, the casings 5 and 6, the water outlet casting 52 and the oil outlet casting 63, are, so far as possible, made to be assembled in any desired relative angular positions, so that the inlet 1, the outlets 24 and 25, and the sump connection 64 may be placed where most convenient.

The number of the radial vanes 28 is in part limited by mechanical considerations at their inner edges; the outer vanes 32 are more numerous. The principal consideration governing the spacing of the vanes is the desirability of ensuring laminar flow through the drum. As is well known there is a limiting speed of flow through any channel above which the flow becomes or is liable to become extremely turbulent. The lower critical velocity below which the flow is laminar depends upon the kinematic coefficient of viscosity of the liquid $(\nu)$,—which is the quotient of the absolute coefficient of viscosity $(\mu)$ and the density $(\rho)$—and upon the mean hydraulic depth of the channel, i. e. the ratio of its cross-section to its wetted perimeter. In the case of uniform circular pipes, for example, the condition of laminar flow is that—

$$\frac{\gamma d \rho}{\mu} \not> 2000$$

where $\gamma$ is the velocity of the liquid and $d$ the diameter of the pipe. In the case of channels of other form there must be substituted for $d$ a constant dependent on the section of the channel and bearing the same relation to its hydraulic mean depth.

It is neither feasible nor necessary to calculate the spacing of the vanes exactly from these theoretical considerations, both because the form of the channels is complex, and because the composition of the liquid treated, the temperature and other material factors are variable; but they afford a guide by which a spacing may be arrived at suitable for a given rate of flow of a given liquid, and the flow for which the apparatus is designed may be vastly greater than could be successfully dealt with by an undivided drum.

The edge of the spinning 34 around which the water escapes, and the ports 35 through which the oil leaves the drum are alike a substantial radial distance from the approximately cylindrical surface of contact between the two separated constituents within the drum; and this surface may shift radially to a considerable extent before there is any risk of either constituent becoming impure. The position of the surface of contact may be controlled by the valves 24 and 25. If the composition of the liquid is liable to vary widely or rapidly, or the apparatus must work unattended, provision may be made for governing the outflow of a particular constituent automatically. In the construction illustrated floats 43 which can move radially upon rods 44 passing through them are linked to and control a ported sleeve 45 which when turned more or less closes the ports 35. The mean specific gravity of the floats must be intermediate between those of the oil and water. The floats will then take up a position in which they are partially immersed in both liquids and will maintain this position notwithstanding any change in the proportion of the liquids, in other words they will move in and out as the cylindrical surface of contact between the liquids moves in and out.

As the centrifugal force acting upon the floats and the liquids may be many times gravity comparatively small floats can exert sufficient force to control a valve. It is desirable that the rods 44 and the bushes of the floats through which they pass should be so shaped as to contact both horizontally and vertically only at two positions a considerable distance apart, as indicated in Figures 8 and 9, in order that there may be no risk of the floats jamming on the rods. Alternatively the floats may be pivoted and operate the valve by swinging in or out.

Another way of automatically actuating control valves is to utilize the axial pressure upon the domed disc 34 which varies with the position of the boundary between the separated constituents. For this purpose the disc must be arranged to slide against spring action and by its movement to throttle the outlet of one or other constituent.

The proper moment for throwing over the valves 24 and 25 may be ascertained by taking samples or by inspecting the issuing streams; but in general it will be sufficient to wait until the drum has reached full speed. A speed indicator 65 may therefore be provided, showing through a window not a numerical indication but a suitable direction to the attendant.

We claim:

1. A centrifugal separator comprising a rotating drum having an inlet at one end and outlets at the other end, means dividing the cross-section of said drum over a part of its length adjacent the inlet into tubular channels parallel with the axis of rotation, and thin partitions dividing the remainder of the length of said drum into narrow channels parallel with the axis of the drum extending from the middle of drum to its periphery.

2. A centrifugal separator comprising a drum rotatably mounted, a fluid inlet at one end of said drum, curved stationary inlet channels for delivering fluid to be treated into said inlet with a high tangential component velocity, tangentially directed outlet channels communicating with the other end of said drum and rotating with the drum, and a multiplicity of vanes parallel with the axis of rotation dividing the interior of said drum into channels of small hydraulic mean depth extending from the periphery of the drum towards its centre, said inlet and outlet channels and drum channels being so relatively proportioned that fluid passing through the drum channels at a less speed than the lower critical velocity will rotate the drum at the speed requisite for the desired separation.

3. In a centrifuge the combination of a rotatable drum having an inlet at one end and an outlet at the other end, of a ring of vanes substantially parallel with the axis of the drum, closely set circumferentially and extending outward from near the axis of the drum, and a second ring of vanes surrounding and extending outward from the first, also substantially parallel with the axis of the drum and closely set circumferentially, and more numerous than the first ring.

4. In a centrifugal separator a rotating separating chamber, radial vanes parallel with the axis of rotation dividing the middle part of said chamber into numerous channels, vanes inclined to radial planes dividing the outer part of said chamber into a still greater number of channels, and means for circumferentially locating the outer edges of said inner vanes and the inner edges of said outer vanes.

5. In a centrifugal separator the combination for a rotating drum having a liquid inlet and liquid outlets near its axis, a separating chamber within said drum having outlets radially distant from each other communicating with the outlets of the drum, a rotary sleeve valve controlling the inner outlet from said chamber, and radially and oppositely sliding floats within said drum linked to said sleeve valve to turn it.

6. A method of treating liquid to separate from it constituents of different specific gravity, which comprises propelling the liquid into a rotatable drum through a reaction turbine and thereby setting the drum and liquid in rotation, propelling the fluid through the drum in laminarly flowing streams extending from the middle of the drum to its periphery, and propelling the fluid out of the drum through a reaction turbine and thereby transferring the angular momentum of the fluid to the drum.

7. A centrifugal separator comprising a drum mounted to rotate about its axis, inlet and outlet channels in and for said drum constituting reaction turbines and maintaining the drum full of liquid, and vanes dividing the whole cross-section of the drum throughout the major part of its length into narrow channels in which liquid propelled at the rate requisite to impart to it and the drum the speed necessary for separation will have laminar flow.

JOSEPH RUSSELL KNOWLES.
BENJAMIN CHARLES CARTER.